(12) United States Patent
Katano (10) Patent No.: US 8,206,856 B2
(45) Date of Patent: Jun. 26, 2012

(54) FUEL CELL SYSTEM (75) Inventor: Koji Katano, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 477 days.

(21) Appl. No.: 12/447,583

(22) PCT Filed: Dec. 26, 2007

(86) PCT No.: PCT/JP2007/075383
§ 371 (c)(1),
(2), (4) Date: Apr. 28, 2009

(87) PCT Pub. No.: WO2008/081979
PCT Pub. Date: Jul. 10, 2008

(65) Prior Publication Data
US 2010/0068578 A1    Mar. 18, 2010

(30) Foreign Application Priority Data
Dec. 28, 2006 (JP) ................... 2006-354664

(51) Int. Cl.
H01M 8/06 (2006.01)
(52) U.S. Cl. ......................... 429/415; 429/429
(58) Field of Classification Search .................. 429/415, 429/429, 437
See application file for complete search history.

(56) References Cited

U.S. PATENT DOCUMENTS

| | | | |
|---|---|---|---|
| 5,958,613 A * | 9/1999 | Hamada et al. | 429/410 |
| 6,179,986 B1 * | 1/2001 | Swette et al. | 205/337 |
| 6,186,254 B1 * | 2/2001 | Mufford et al. | 429/442 |
| 7,282,285 B2 * | 10/2007 | Couch et al. | 429/429 |
| 7,662,496 B2 * | 2/2010 | Fujita et al. | 429/413 |
| 7,794,218 B2 * | 9/2010 | Fujita | 418/206.5 |
| 7,975,788 B2 * | 7/2011 | Yoshida et al. | 180/65.31 |
| 2005/0181245 A1 * | 8/2005 | Bonne et al. | 429/12 |

(Continued)

FOREIGN PATENT DOCUMENTS

DE          603 04 255 T2      8/2006

(Continued)

OTHER PUBLICATIONS

Office Action issued Jan. 27, 2012 in German Patent Application No. 11 2007 003 163.8-45 and English translation thereof.

Primary Examiner — Thanh Tam Le
(74) Attorney, Agent, or Firm — Kenyon & Kenyon LLP (57) ABSTRACT A fuel cell system having a cooling water pump provided in cooling water piping that sends cooling water to a fuel cell and sending the cooling water under pressure, fuel gas supply piping connected to the fuel cell and supplying fuel gas to the fuel cell, fuel gas circulation piping connected to both the fuel cell and the fuel gas supply piping and circulating fuel gas, discharged from the fuel cell, in the fuel gas supply piping, and a fuel gas pump provided in the fuel gas circulation piping and sending under pressure the fuel gas, discharged from the fuel cell, to the fuel gas supply piping. After operation of the fuel cell is stopped, the fuel gas, discharged from the fuel cell, is sent under pressure by the fuel gas pump, and cooling water is send under pressure by the cooling water pump to cool the fuel cell to thereby reduce the temperature of the fuel cell to a level lower than the temperature of the fuel gas pump.

6 Claims, 3 Drawing Sheets

U.S. PATENT DOCUMENTS

| | | |
|---|---|---|
| 2006/0216555 A1* | 9/2006 | Shige et al. ............... 429/19 |
| 2007/0092772 A1* | 4/2007 | Nishimura et al. ......... 429/23 |
| 2007/0205111 A1* | 9/2007 | Bayliss ..................... 205/637 |
| 2008/0038608 A1* | 2/2008 | Yoshida .................... 429/25 |
| 2008/0063902 A1* | 3/2008 | Kawasaki et al. ......... 429/10 |

FOREIGN PATENT DOCUMENTS

| | | |
|---|---|---|
| DE | 11 2007 000 822 T5 | 1/2009 |
| JP | 2000-164232 A | 6/2000 |
| JP | 2003-178782 A | 6/2003 |
| JP | 2004-193102 A | 7/2004 |
| JP | 2005-531904 T | 10/2005 |
| JP | 2005-317224 A | 11/2005 |
| JP | 2006-244926 A | 9/2006 |
| JP | 2007-328972 A | 12/2007 |
| WO | 2005/018980 A2 | 3/2005 |

\* cited by examiner

FIG. 3B

FUEL CELL SYSTEM

This is a 371 national phase application of PCT/JP2007/075383 filed 26 Dec. 2007, claiming priority to Japanese Patent Application No. JP 2006-354664 filed 28 Dec. 2006, the contents of which are incorporated herein by reference.

TECHNICAL FIELD

The present invention relates to a fuel cell system, and in particular to a fuel cell system comprising a cooling water pump which is provided on cooling water piping which transports cooling water to a fuel cell and which pumps the cooling water, fuel gas supply piping which is connected to the fuel cell and which supplies a fuel gas to the fuel cell, fuel gas circulation piping which is connected to the fuel cell and to the fuel gas supply piping and which circulates a fuel gas discharged from the fuel cell to the fuel gas supply piping, and a fuel gas pump which is provided on the fuel gas circulation piping and which pumps the fuel gas discharged from the fuel cell to the fuel gas supply piping, wherein the fuel gas discharged from the fuel cell is pumped by the fuel gas pump after the operation of the fuel cell is stopped.

BACKGROUND ART

A fuel cell has recently attracted much attention as a cell having a high efficiency and superior environmental characteristics. In general, a fuel cell generates electric energy through a chemical reaction between hydrogen which is a fuel gas and oxygen in the air which is an oxidizing agent gas. As a result of the electrochemical reaction between hydrogen and oxygen, water is produced.

The types of fuel cell include phosphoric acid fuel cells, molten carbonate fuel cells, solid oxide fuel cells, alkaline fuel cells, and polymer electrolyte fuel cells. Of these, a fuel cell system has attracted much attention which uses a polymer electrolyte fuel cell because such a fuel cell system has advantages such as that the system can be started up at normal temperatures and the startup time is short. Such a fuel cell system is used, for example, as a power source of a vehicle, in particular, an electric automobile.

In a fuel cell system, when a stopped state of a fuel cell is continued for a long period of time under a low-temperature environment such as, for example, outdoors in cold climate areas, the valves, pumps, etc. in the fuel cell system may freeze due to moisture such as the product water remaining in the fuel cell system. Because of this, various methods have been developed and proposed for preventing freezing of the valves, pumps, etc. in the fuel cell system.

For example, JP 2004-193102 A discloses a fuel cell operating method in which supply of power from the fuel cell is cut, an external air temperature is detected, a reaction gas is supplied to the reaction gas flow path according to the external air temperature to discharge the water in the reaction gas flow path, and the operation of the fuel cell is stopped.

In a fuel cell system, during operation of the fuel cell, a fuel gas discharged from the fuel cell is compressed by the fuel gas pump such as a hydrogen pump, and the compressed fuel gas is pumped to the fuel cell for reuse. During the operation of the fuel cell, because the fuel gas discharged from the fuel cell contains moisture, water may remain in the valve or the like in the fuel cell system. Because of this, a drying process is applied after the operation of the fuel cell is stopped, by driving the fuel gas pump and pumping the fuel gas.

During the drying process, the moisture remaining in the fuel cell system is absorbed by the fuel cell discharged from the fuel cell. Because of this, the moisture contained in the fuel gas discharged from the fuel cell may condense in the fuel gas pump and condensation may occur. When, for example, the stopped state of the fuel cell is continued under a low-temperature environment, the fuel gas pump may freeze up.

DISCLOSURE OF INVENTION

An object of the present invention is to provide a fuel cell system in which condensation of moisture in the fuel gas pump after the operation of the fuel is stopped is inhibited and the fuel gas discharged from the fuel cell is pumped by the fuel gas pump.

According to one aspect of the present invention, there is provided a fuel cell system comprising a cooling water pump which is provided on cooling water piping which transports cooling water to a fuel cell and which pumps the cooling water, a fuel gas supply piping which is connected to the fuel cell and which supplies a fuel gas to the fuel cell, fuel gas circulation piping which is connected to the fuel cell and to the fuel gas supply piping and which circulates a fuel gas discharged from the fuel cell to the fuel gas supply piping, and a fuel gas pump which is provided on the fuel gas circulation piping and which pumps the fuel gas discharged from the fuel cell to the fuel gas supply piping, wherein the fuel gas discharged from the fuel cell is pumped by the fuel gas pump after an operation of the fuel cell is stopped, and the cooling water is pumped by the cooling water pump to cool the fuel cell and lower a temperature of the fuel cell to a lower temperature than a temperature of the fuel gas pump after the operation of the fuel cell is stopped.

According to another aspect of the present invention, it is preferable that, in the fuel cell system, the fuel gas pump is stopped after the cooling water pump is stopped.

According to another aspect of the present invention, it is preferable that, in the fuel cell system, the cooling water pump is stopped and the fuel gas pump is stopped after the temperature of the fuel cell is lowered to a lower temperature than the temperature of the fuel gas pump.

According to another aspect of the present invention, it is preferable that the fuel cell system further comprises a radiator which is provided on the cooling water piping and which cools cooling water discharged from the fuel cell, wherein cooling water cooled by the radiator is pumped and the fuel cell is cooled after the operation of the fuel cell is stopped.

According to the fuel cell system of various aspects of the present invention, by lowering the temperature of the fuel cell to a lower temperature than the temperature of the fuel gas pump after the operation of the fuel cell is stopped, it is possible to inhibit condensation of moisture in the fuel gas pump and to pump the fuel gas discharged from the fuel cell by the fuel gas pump.

BRIEF DESCRIPTION OF DRAWINGS

FIG. 2 (A) is a diagram showing changes in the temperature of the fuel cell and the temperature of the fuel gas pump when the fuel cell is cooled without driving the cooling water pump after the operation of the fuel cell is stopped (where fuel cell temperature>fuel gas pump temperature at the time of stopping of the operation of the fuel cell).

FIG. 2 (B) is a diagram showing changes in the temperature of the fuel cell and the temperature of the fuel gas pump when the fuel cell is cooled with driving of the cooling water pump after the operation of the fuel cell is stopped (where fuel cell temperature>fuel gas pump temperature at the time of stopping of the operation of the fuel cell).

BEST MODE FOR CARRYING OUT THE INVENTION

A preferred embodiment of the present invention will now be described in detail with reference to the diagrams.

Figure 1:
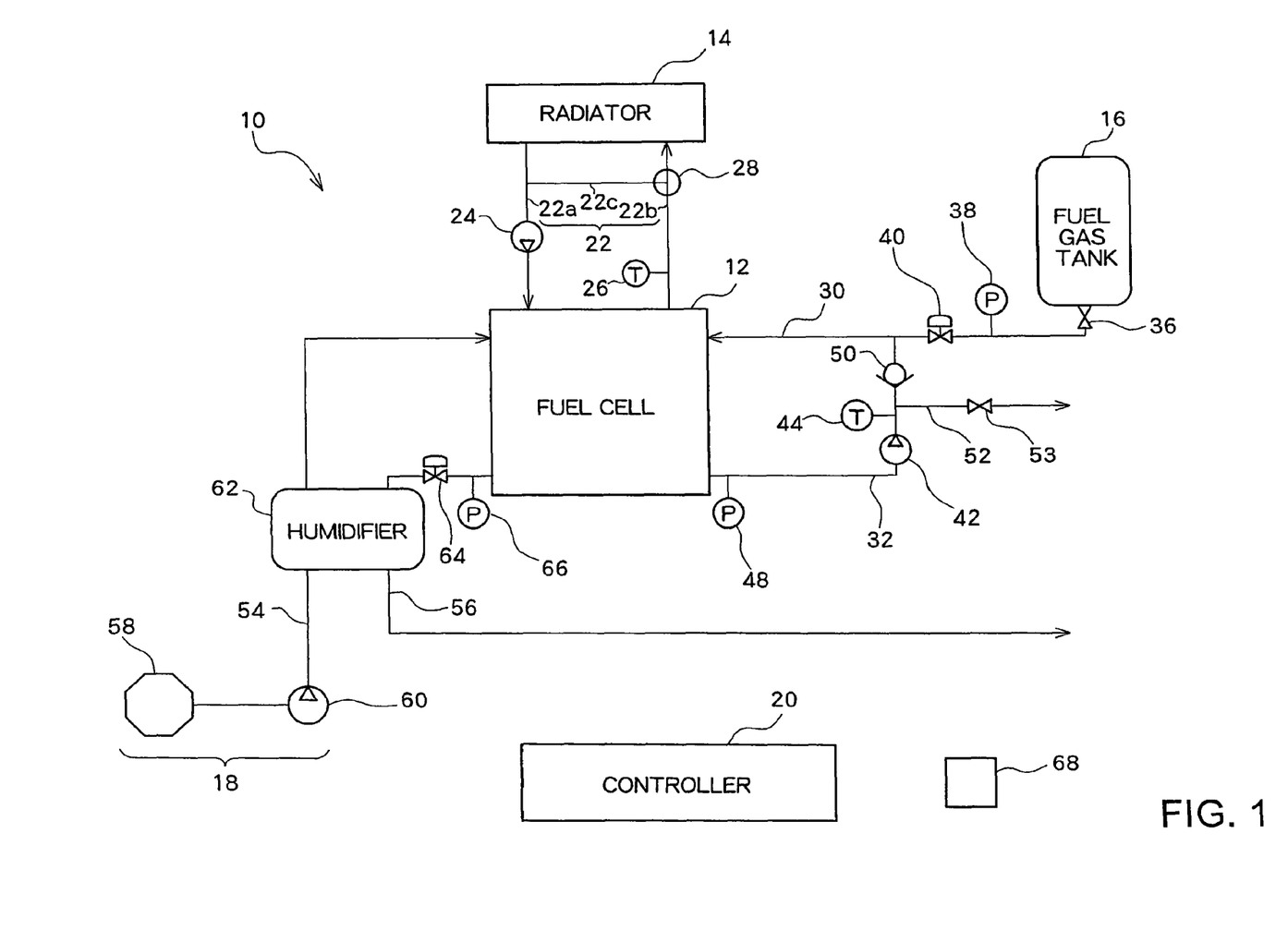
FIG. 1 is a diagram showing a structure of a fuel cell system in a preferred embodiment according to the present invention.

FIG. 1 is a diagram showing a structure of a fuel cell system 10. The fuel cell system 10 comprises a fuel cell 12, a cooling water system having a radiator 14, etc., a fuel gas system having a fuel gas supplying device 16, etc., an oxidizing agent gas system having an oxidizing agent gas supplying device 18, etc., and a controller 20.

The fuel cell 12 has a function to generate power through an electrochemical reaction between a fuel gas such as hydrogen and an oxidizing agent gas such as oxygen. The fuel cell 12, for example, a polymer electrolyte fuel cell 12, includes a stack which is assembled by layering a plurality of single cells. A single cell is assembled by layering catalyst layers on both sides of an electrolyte membrane, layering a gas diffusion layer on each catalyst layer to form a membrane electrode assembly, and further layering a separator on the membrane electrode assembly. By providing a current collector on both sides of such a stack, it is possible to extract current from the current collector.

The electrolyte membrane has functions such as a function to move hydrogen ions produced on the side of the anode electrode to the side of the cathode electrode. As a material of the electrolyte membrane, an ion exchange membrane of a fluorine-based resin which is chemically stable, such as, for example, perfluorocarbon sulfonic acid is used. As the ion exchange membrane of perfluorocarbon sulfonic acid, for example, Nafion membrane (registered trademark of Du Pont Corporation) may be used.

The catalyst layer has a function to promote an oxidation reaction of hydrogen on the side of the anode electrode and a reduction reaction of oxygen on the side of the cathode electrode. The catalyst layer includes a catalyst and a carrier of the catalyst. In general, the catalyst is formed in the form of particulates and is attached to the carrier of the catalyst for use, in order to increase the area of the electrode on which a reaction is to occur. As the catalyst, platinum or the like which is a platinum group element having a small activation overvoltage for the oxidation reaction of hydrogen and the reduction reaction of oxygen is used. As the carrier of the catalyst, a carbon material, for example, carbon black, is used.

The gas diffusion layer has functions such as a function to diffuse hydrogen which is the fuel and oxygen which is the oxidizing agent to the catalyst layer and a function to move the electrons. For the gas diffusion layer, woven fabric of carbon fiber or carbon paper which is a material having a conductive characteristic may be used. The membrane electrode assembly can be manufactured by layering the electrolyte membrane, the catalyst layer, and the gas diffusion layer, and applying a heat press or the like.

The separator is layered on the gas diffusion layer of the membrane electrode assembly, and has a function to separate hydrogen which is the fuel gas and air which is the oxidizing agent at adjacent single cells. The separator also has a function to electrically connect one single cell to another single cell. The separator may be formed, for example, by applying a press work to a titanium sheet or a stainless steel sheet.

The cooling water system of the fuel cell system 10 comprises cooling water piping 22 which circulates and transports cooling water to the fuel cell 12. The cooling water piping 22 comprises cooling water supply piping 22a which supplies the cooling water to the fuel cell 12, a cooling water discharge piping 22b which discharges the cooling water from the fuel cell 12, and cooling water bypass piping 22c which is connected to the cooling water supply piping 22a and the cooling water discharge piping 22b. The cooling water may include LONG LIFE COOLANT, or the like.

The radiator 14 has a function to discharge heat of the cooling water to the outside, is provided on the cooling water piping 22, and is connected to the cooling water supply piping 22a and the cooling water discharge piping 22b. By sending the cooling water discharged from the fuel cell 12 transported in the cooling water discharge piping 22b to the radiator 14, it is possible to discharge the heat of the cooling water discharged from the fuel cell 12 and cool the cooling water discharged from the fuel cell 12. The cooling water cooled by the radiator 14 is transported in the cooling water supply piping 22a and is supplied to the fuel cell 12.

A cooling water pump 24 has a function to pressurize and pump the cooling water and is provided on the cooling water piping 22.

By pumping and circulating the cooling water with the cooling water pump 24, it is possible to cool the fuel cell 12. The cooling water pump 24 may be provided on the cooling water supply piping 22a or on the cooling water discharge piping 22b. As the cooling water pump 24, for example, a pump which is driven through rotation of a motor is used. Starting and stopping of the cooling water pump 24 are executed based on a control of the controller 20.

A cooling water temperature sensor 26 has a function to measure a temperature of the cooling water and is provided on the cooling water discharge piping 22b. By providing the cooling water temperature sensor 26 on the cooling water discharge piping 22b, it is possible to measure the temperature of the cooling water discharged from the fuel cell 12. As the cooling water temperature sensor 26, for example, a temperature sensor such as a thermocouple may be used. Cooling water temperature data measured by the cooling water temperature sensor 26 is sent to the controller 20.

After the operation of the fuel cell 12 is stopped, the temperature of the cooling water discharged from the fuel cell 12 can be used as the fuel cell temperature, because the power generation by the fuel cell 12 is stopped after the operation of the fuel cell 12 is stopped, and thus the cooling water temperature of the cooling water discharged from the fuel cell 12 and the fuel cell temperature are approximately equal to each other. Alternatively, it is also possible to provide a temperature sensor or the like at a predetermined site of the fuel cell 12 and measure the fuel cell temperature.

A cooling water switching valve 28 has a function to switch a direction of flow of the cooling water discharged from the fuel cell 12, and is connected to the cooling water discharge piping 22b and the cooling water bypass piping 22c. The cooling water switching valve 28 may switch, based on a control of the controller 20, the flow of the cooling water discharged from the fuel cell 12 to the side of the radiator 14 or to the side of the cooling water bypass piping 22c. For example, when the fuel cell 12 is to be further cooled, the cooling water switching valve 28 maybe switched to the side of the radiator 14 based on the control of the controller 20, so that the cooling water discharged from the fuel cell 12 flows to the radiator 14, and the cooling water cooled by the radiator 14 is supplied to the fuel cell 12. When, on the other hand, the cooling of the fuel cell 12 is to be inhibited, the cooling water switching valve 28 may be switched to the side of the cooling water bypass piping 22c based on the control of the controller 20, so that the cooling water discharged from the fuel cell 12 flows to the cooling water bypass piping 22c and is supplied to the fuel cell 12. As the cooling water switching valve 28, for example, a three-way valve may be used.

The fuel gas system of the fuel cell system 10 comprises a fuel gas supply piping 30 which is connected to the fuel cell 12 and which transports and supplies the fuel gas to the anode of the fuel cell 12, and a fuel gas circulation piping 32 which is connected to the fuel cell 12 and the fuel gas supply piping 30 and which transports the fuel gas discharged from the anode of the fuel cell 12 and circulates the fuel gas to the fuel gas supply piping 30.

The fuel gas supplying device 16 has a function to supply the fuel gas such as hydrogen, and is connected to the fuel gas supply piping 30. The fuel gas supplying device 16 may be formed, for example, with a high-pressure fuel gas tank such as a high-pressure hydrogen tank. Alternatively, the fuel gas supplying device 16 may comprise a hydrogen absorbing alloy or a reformer. In addition, a blocking valve 36 which controls supply and stopping of the fuel gas from the fuel gas supplying device 16, a pressure sensor 38 which detects a pressure of a fuel gas, a pressure adjusting valve 40 for fuel gas which adjusts the pressure of the fuel gas, a blocking valve (not shown) which opens and closes a fuel gas supplying port of the fuel cell 12, etc. are provided on the fuel gas supply piping 30.

A fuel gas pump 42 has a function to pump the fuel gas discharged from the fuel cell 12 to the fuel gas supply piping 30 and is provided on the fuel gas circulation piping 32. With the fuel gas pump 42, the fuel gas having a loss of pressure during passage of the anode of the fuel cell 12 can be compressed, the pressure can be boosted to a suitable gas pressure, and the fuel gas can be returned to the fuel gas supply piping 30. The fuel gas discharged from the fuel cell 12 is merged with the fuel gas supplied from the fuel gas supplying device 16 at the fuel gas supply piping 30, and is supplied to and reused in the fuel cell 12. As the fuel gas pump 42, for example, a pump which is driven by the rotation of the motor or the like is used. Starting and stopping of the fuel gas pump 42 may be executed based on a control by the controller 20.

A fuel gas temperature sensor 44 has a function to measure temperature of the fuel gas, and is provided on the fuel gas circulation piping 32. By providing the fuel gas temperature sensor 44 on the side of discharge of the fuel gas in the fuel gas pump 42, it is possible to measure the temperature of the fuel gas discharged from the fuel gas pump 42. As the fuel gas temperature sensor 44, for example, a temperature sensor such as a thermocouple is used. Fuel gas temperature data measured by the fuel gas temperature sensor 44 is sent to the controller 20.

The temperature of the fuel gas discharged from the fuel gas pump 42 may be used as the fuel gas pump temperature, because the temperature of the fuel gas discharged from the fuel gas pump 42 and the fuel gas pump temperature are approximately equal to each other. Alternatively, a temperature sensor or the like may be provided at a predetermined site of the fuel gas pump 42, to measure the fuel gas pump temperature.

A blocking valve (not shown) which discharges the fuel gas, a pressure sensor 48 which detects a pressure of the fuel gas, a check valve 50 which prevents back-flow of the fuel gas transported in the fuel gas supply piping 30 to the side of the fuel gas circulation piping 32, etc. are provided on the fuel gas circulation piping 32. In addition, fuel gas discharge piping 52 for discharging, to the outside of the vehicle through a diluter (not shown) such as a hydrogen concentration reducing device, the fuel gas discharged from a fuel gas circulation system branches from the fuel gas circulation piping 32. A discharge valve 53 is provided on the fuel gas discharge piping 52. By opening and closing the discharge valve 53, it is possible to discharge, to the outside, the fuel gas having an increased impurity concentration due to repeated circulation in the fuel cell 12, and to introduce a new fuel gas, to prevent reduction of voltage in the fuel cell 12.

The oxidizing agent gas system of the fuel cell system 10 comprises oxidizing agent gas supply piping 54 having a function to transport and supply an oxidizing agent gas to a cathode of the fuel cell 12, and oxidizing agent gas discharge piping 56 which has a function to transport the oxidizing agent gas discharged from the cathode of the fuel cell 12. The oxidizing agent gas supplying device 18 has a function to supply an oxidizing agent gas such as compressed air, and is connected to the oxidizing agent gas supply piping 54. The oxidizing agent gas supplying device 18 comprises, for example, an air filter 58 which removes dust or the like contained in the air taken in from the atmosphere, and a pump or an air compressor 60 which is driven by a motor and which has a function as a pumping unit for pumping the air.

A humidifier 62 is connected to the oxidizing agent gas supply piping 54 and the oxidizing agent gas discharge piping 56, placed between the oxidizing agent gas supplying device 18 and the fuel cell 12, and has a function to exchange moisture between the oxidizing agent gas which is in a high-humidity state due to the product water produced by the electrochemical reaction in the fuel cell 12 and the oxidizing agent gas which is in a low-humidity state taken in from the atmosphere. With the humidifier 62, it is possible to humidify the oxidizing agent gas which is in the low-humidity state taken in from the atmosphere.

A pressure adjusting valve 64 for oxidizing agent gas is placed on the oxidizing agent gas supply piping 54 or on the oxidizing agent gas discharge piping 56, and has a function to adjust the pressure of the oxidizing agent gas in the cathode. As the pressure adjusting valve 64 for oxidizing agent gas, an electromagnetic valve or the like which is generally used for adjusting pressure of gas such as air, may be used. A pressure sensor 66 or the like which detects a pressure of the oxidizing agent gas is provided on the oxidizing agent gas supply piping 54 or on the oxidizing agent gas discharge piping 56. The oxidizing agent gas flowing in the oxidizing agent gas discharge piping 56 is discharged to the outside of the vehicle through, for example, a gas-liquid separator or a muffler.

An external air temperature sensor 68 has a function as a temperature measuring unit which measures temperature of the external air, and is provided in the fuel cell system 10. As the external air temperature sensor 68, for example, a thermocouple or the like may be used. External air temperature data which is measured by the external air temperature sensor 68 is sent to the controller 20.

The controller 20 is constructed as a microcomputer having therein a CPU, a RAM, and a ROM, and executes control of operations of various constituting units of the fuel cell system 10 according to a program stored in the ROM. The controller 20 receives sensor signals from temperature sensors placed in various piping such as the cooling water temperature sensor 26, the fuel gas temperature sensor 44, and the external air temperature sensor 68 and from pressure sensors 38, 48, and 66, and drives motors to adjust rotational speeds of the cooling water pump 24, the fuel gas pump 42, the air compressor 60, etc., according to the operation state (for example, power load) of the fuel cell 12. The controller 20 further controls opening and closing of, or adjusts degree of valve opening of, various valves such as the cooling water switching valve 28. The controller 20 is connected, for example, through an electrical cable or the like (not shown) to the pumps, the sensors such as the temperature sensor and pressure sensor, and valves such as the switching valve.

Next, operation of the fuel cell system 10 will be described.

After the operation of the fuel cell 12 is stopped, the fuel gas discharged from the fuel cell 12 is pumped by the fuel gas pump 42 and a drying process is applied. First, the fuel gas supplied from the fuel gas supplying device 16 is transported in the fuel gas supply piping 30 and is supplied to the fuel cell 12. The fuel gas discharged from the fuel cell 12 is transported in the fuel gas circulation piping 32, is pumped by the fuel gas pump 42, and is returned to the fuel gas supply piping 30. Because the fuel gas discharged from the fuel cell 12 absorbs moisture such as water vapor remaining in the circulation piping 32 or in the valves or the like provided on the fuel gas circulation piping 32, a drying process is applied to the fuel gas circulation piping 32 or to the valve or the like provided on the fuel gas circulation piping 32.

The controller 20 receives the cooling water temperature data which is sent from the cooling water temperature sensor 26 and the fuel gas temperature data which is sent from the fuel gas temperature sensor 44, and compares the cooling water temperature and the fuel gas temperature. When the temperature of the cooling water discharged from the fuel cell 12 is higher than the temperature of the fuel gas discharged form the fuel gas pump 42, the controller 20 determines that the fuel cell temperature is higher than the fuel gas pump temperature.

When the fuel cell temperature is higher than the fuel gas pump temperature, the controller 20 drives the cooling water pump 24. Because the cooling water is pumped by the cooling water pump 24 and is supplied to the fuel cell 12, the fuel cell 12 is cooled and the fuel cell temperature is lowered. It is preferable that the cooling water pump 24 is driven with a higher rotational speed of the motor than that during the operation of the fuel cell 12.

With such a configuration, the circulation of the cooling water can be accelerated, and the cooling rate of the fuel cell 12 can be accelerated.

The controller 20 preferably switches the cooling water switching valve 28 to the side of the radiator 14 so that the cooling water discharged from the fuel cell 12 flows to the radiator 14. Because the cooling water discharged from the fuel cell 12 is cooled by the radiator 14, the cooling rate of the fuel cell 12 can be accelerated. During this process, the fan of the radiator 14 is preferably rotated. With such a configuration, the cooling rate of the fuel cell 12 can be further accelerated.

The fuel gas pump 42 is preferably driven with a higher rotational speed of the motor than that during the operation of the fuel cell 12. With such a configuration, the fuel gas pump 42 is heated by the discharged heat of the motor or the like, and, consequently, the lowering of the fuel gas pump temperature can be inhibited.

Because the fuel cell 12 is cooled by the cooling water, the fuel cell temperature is lowered to a lower temperature than the fuel gas pump temperature. With such a configuration, for the fuel gas containing moisture and circulating through the fuel cell 12, the fuel gas supply piping 30, and the fuel gas circulation piping 32, the moisture condenses in the fuel cell 12, and the condensation of the moisture in the fuel gas pump 42 is inhibited.

After the fuel cell temperature is lowered to a lower temperature than the fuel gas pump temperature and the fuel cell temperature is lowered, for example, to a temperature near the external air temperature measured by the external air temperature sensor 68, the cooling water pump 24 is controlled by the controller 20 and is stopped. Because the fuel cell temperature is lower than the fuel gas pump temperature, the moisture contained in the fuel gas discharged from the fuel cell 12 condenses in the fuel cell 12, and the condensation in the fuel gas pump 42 is inhibited.

Here, it is preferable to stop the cooling water pump 24 while the fuel gas pump 42 is driven. This is because by driving the fuel gas pump 42 even when the cooling water pump 24 is stopped, it is possible to maintain the fuel gas pump temperature at a higher temperature than the fuel cell temperature, even when the fuel cell temperature is increased slightly due to stopping of the cooling water pump 24. After the controller 20 stops the cooling water pump 24, the controller 20 stops the fuel gas pump 42.

In the above-described configuration, a case is described where the cooling water pump 24 is driven and the fuel cell 12 is cooled when the fuel cell temperature is higher than the fuel gas pump temperature after the operation of the fuel cell 12 is stopped. Alternatively, the cooling water pump 24 may be driven and the fuel cell 12 may be cooled even when the fuel cell temperature is lower than the fuel gas pump temperature after the operation of the fuel cell 12 is stopped. By driving the cooling water pump 24 and cooling the fuel cell 12 even when the fuel cell temperature is lower than the fuel gas pump temperature, it is possible to more reliably maintain the fuel cell temperature at a lower temperature than the fuel gas pump temperature.

Figure 2A:
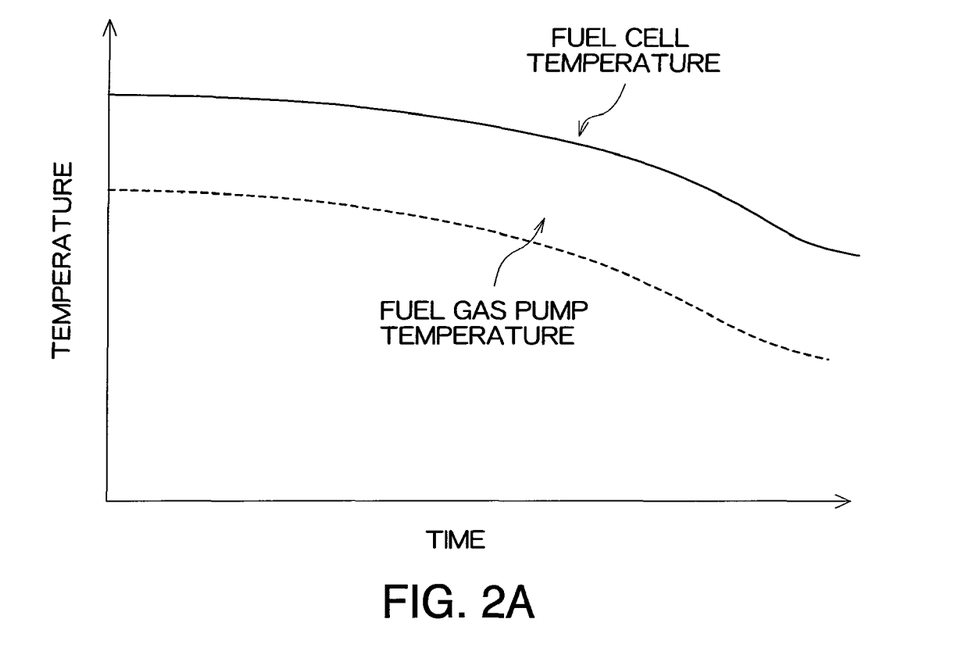
Figure 2B:
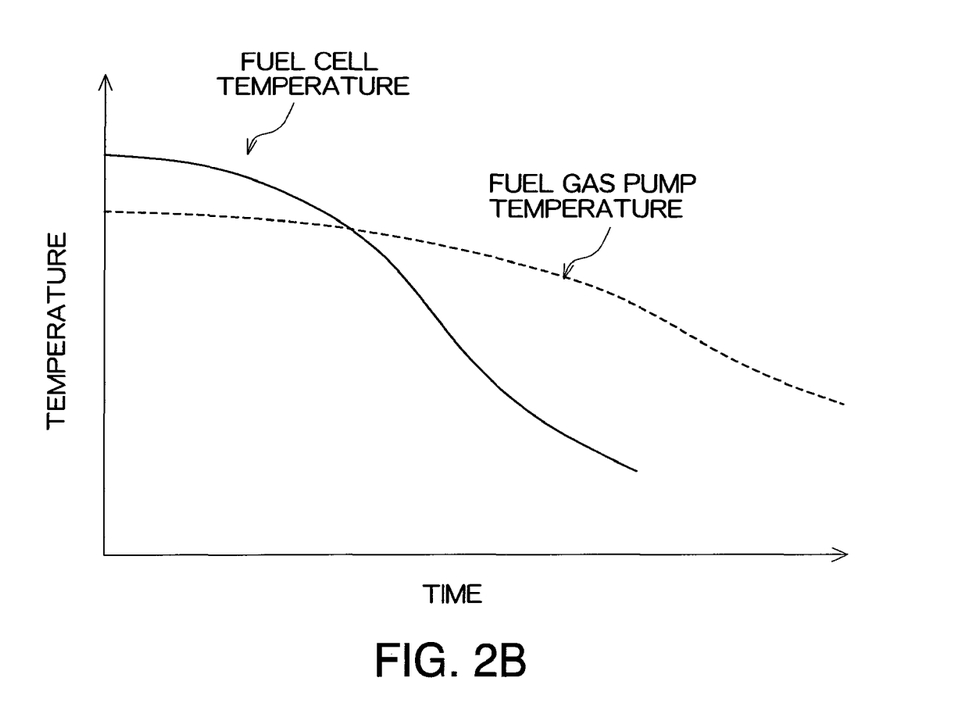

FIG. 2 is a diagram showing changes in the fuel cell temperature and the fuel gas pump temperature after the operation of the fuel cell 12 is stopped (where fuel cell temperature >fuel gas pump temperature at the time of stopping of the operation of the fuel cell 12). FIG. 2 (A) is a diagram showing a case where the fuel cell 12 is cooled without driving the cooling water pump 24 after the operation of the fuel cell 12 is stopped, and FIG. 2 (B) is a diagram showing a case where the cooling water pump 24 is driven and the fuel cell 12 is cooled after the operation of the fuel cell 12 is stopped. In FIG. 2, the horizontal axis represents the elapsed time from the time of stopping of the operation of the fuel cell 12 and the vertical axis represents the fuel cell temperature and the fuel gas pump temperature. A change with respect to time of the fuel cell temperature is shown with a solid line and a change with respect to time of the fuel gas pump temperature is shown with a dotted line. FIG. 2 shows cases in which the fuel cell temperature is higher than the fuel gas pump temperature at the time of stopping of the operation of the fuel cell 12.

When the fuel cell 12 is cooled without driving the cooling water pump 24 after the operation of the fuel cell 12 is stopped, the fuel cell temperature is gradually lowered, as shown in FIG. 2 (A). Because the fuel cell temperature is higher than the fuel gas pump temperature, the moisture contained in the fuel gas condenses in a larger part in the fuel gas pump 42 than in the fuel cell 12. When the cooling water pump 24 is driven and the fuel cell 12 is cooled after the operation of the fuel cell 12 is stopped, as shown in FIG. 2 (B), the fuel cell temperature is lowered more quickly than the case in which the fuel cell 12 is cooled without driving the cooling water pump 24. Because of this, the fuel cell temperature is lowered to a lower temperature than the fuel gas pump temperature, and the moisture contained in the fuel gas condenses in the fuel cell 12. As a result, the condensation of the moisture in the fuel gas pump 42 is inhibited.

Figure 3A:
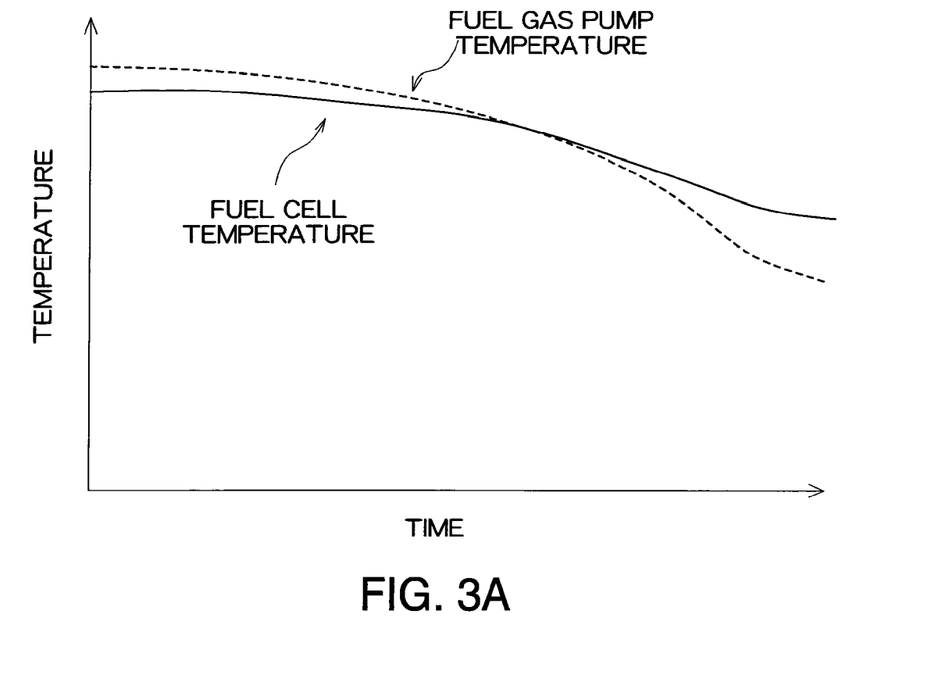
FIG. 3(A) is a diagram showing changes in the temperature of the fuel cell and the temperature of the fuel gas pump when the fuel cell is cooled without driving the cooling water pump after the operation of the fuel cell is stopped (where fuel cell temperature<fuel gas pump temperature at the time of stopping of the operation of the fuel cell).
Figure 3B:
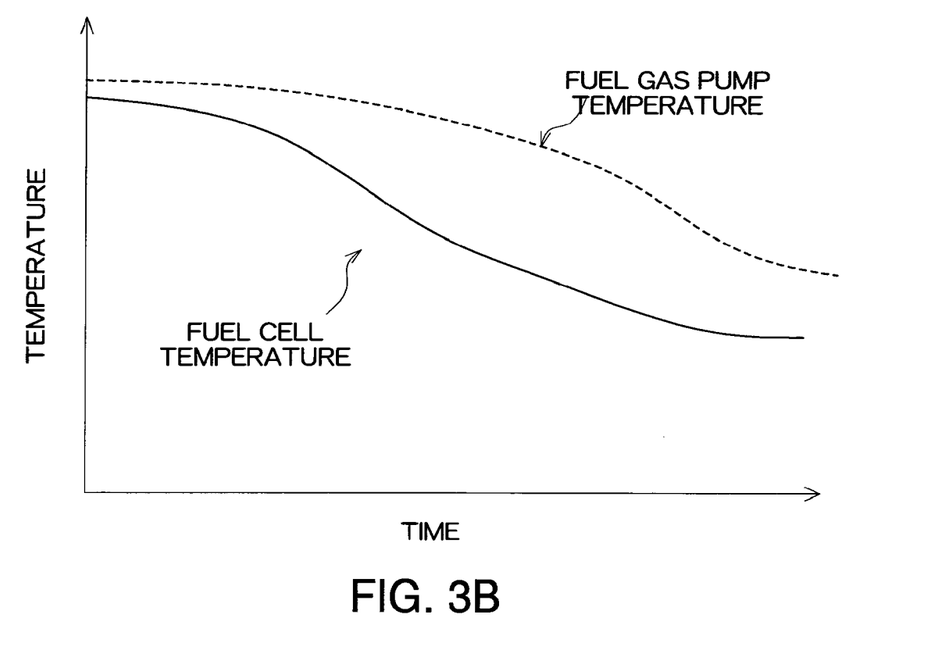
FIG. 3(B) is a diagram showing changes in the temperature of the fuel cell and the temperature of the fuel gas pump when the fuel cell is cooled with driving of the cooling water pump after the operation of the fuel cell is stopped (where fuel cell temperature<fuel gas pump temperature at the time of stopping of the operation of the fuel cell).

FIG. 3 is a diagram showing changes in the fuel cell temperature and the fuel gas pump temperature after the operation of the fuel cell 12 is stopped (wherein fuel cell temperature <fuel gas pump temperature at the time of stopping of the operation of the fuel cell 12). FIG. 3 (A) shows a case where the fuel cell 12 is cooled without driving the cooling water pump 24 after the operation of the fuel cell 12 is stopped and FIG. 3 (B) shows a case where the cooling water pump 24 is driven and the fuel cell 12 is cooled after the operation of the fuel cell 12 is stopped. In FIG. 3, the horizontal axis represents the elapsed time from the time of stopping of the operation of the fuel cell 12, and the vertical axis represents the fuel cell temperature and the fuel gas pump temperature. A change with respect to time of the fuel cell temperature is shown with a solid line and a change with respect to time of the fuel gas pump temperature is shown with a dotted line. FIG. 3 shows cases where the fuel cell temperature is lower than the fuel gas pump temperature at the time of stopping the operation of the fuel cell 12.

When the fuel cell 12 is cooled without driving the cooling water pump 24 after the operation of the fuel cell 12 is stopped, the fuel cell temperature is gradually lowered, as shown in FIG. 3(A). Because the fuel gas pump 42 generally has a smaller thermal capacity than the fuel cell 12, the cooling speed of the fuel gas pump 42 is faster than the cooling speed of the fuel cell 12. Because of this, even when the fuel cell temperature is lower than the fuel gas pump temperature when the operation of the fuel cell 12 is stopped, the fuel cell temperature may become higher than the fuel gas pump temperature after a predetermined amount of time has elapsed from the time when the operation of the fuel cell 12 is stopped. As a result, the moisture contained in the fuel gas may condense in a larger proportion in the fuel gas pump 42 than in the fuel cell 12.

When the cooling water pump 24 is driven and the fuel cell 12 is cooled after the operation of the fuel cell 12 is stopped, as shown in FIG. 3(B), the fuel cell temperature is more quickly lowered compared to the case where the fuel cell 12 is cooled without driving the cooling water pump 24. Because of this, even when the fuel cell temperature is lower than the fuel gas pump temperature when the operation of the fuel cell 12 is stopped, it is possible to more reliably maintain the fuel cell temperature at a lower temperature than the fuel gas pump temperature by driving the cooling water pump 24 and cooling the fuel cell 12. With such a configuration, the moisture contained in the fuel gas condenses in the fuel cell 12, and as a result, condensation of the moisture in the fuel gas pump 42 is inhibited.

With the above-described structure, by pumping the cooling water with the cooling water pump and cooling the fuel cell after the operation of the fuel cell is stopped so that the fuel cell temperature is lowered to a lower temperature than the fuel gas pump temperature, it is possible to inhibit condensation of the moisture in the fuel gas pump, to pump, with the fuel gas pump, the fuel gas discharged from the fuel cell, and to apply the drying process. Because the condensation of the moisture in the fuel gas pump is inhibited, it is possible to inhibit freezing of the fuel gas pump even when the state of stopping of the fuel cell is continued for a long period of time under a low-temperature environment.

According to the above-described structure, after the operation of the fuel cell is stopped, by stopping the fuel gas pump after the cooling water pump is stopped, it is possible to more reliably lower the fuel cell temperature to a lower temperature than the fuel gas pump temperature.

With the above-described structure, by pumping the cooling water cooled by the radiator and cooling the fuel cell after the operation of the fuel cell is stopped, it is possible to more quickly cool the fuel cell and lower the fuel cell temperature to a lower temperature than the fuel gas pump temperature.

INDUSTRIAL APPLICABILITY

A fuel cell system of the present invention is effective in any usage which uses a fuel cell, and is particularly useful in a fuel cell for a vehicle.

The invention claimed is:

1. A fuel cell system comprising:
a controller;
a cooling water pump which is provided on cooling water piping which transports cooling water to a fuel cell and which pumps the cooling water;
fuel gas supply piping which is connected to the fuel cell and which supplies a fuel gas to the fuel cell;
fuel gas circulation piping which is connected to the fuel cell and to the fuel gas supply piping and which circulates a fuel gas discharged from the fuel cell to the fuel gas supply piping; and
a fuel gas pump which is provided on the fuel gas circulation piping and which pumps the fuel gas discharged from the fuel cell to the fuel gas supply piping,
wherein the fuel gas discharged from the fuel cell is pumped by the fuel gas pump after an operation of the fuel cell is stopped, and
the controller is programmed to control the cooling water pump so that the cooling water is pumped by the cooling water pump to cool the fuel cell and lower a temperature of the fuel cell to a lower temperature than a temperature of the fuel gas pump after the operation of the fuel cell is stopped.

2. The fuel cell system according to claim 1, wherein the fuel gas pump is stopped after the cooling water pump is stopped.

3. The fuel cell system according to claim 2, wherein the cooling water pump is stopped and the fuel gas pump is stopped after the temperature of the fuel cell is lowered to a lower temperature than the temperature of the fuel gas pump.

4. The fuel cell system according to claim 1, further comprising
a radiator which is provided on the cooling water piping and which cools cooling water discharged from the fuel cell, wherein
cooling water cooled by the radiator is pumped and the fuel cell is cooled after the operation of the fuel cell is stopped.

5. The fuel cell system according to claim 2, further comprising
a radiator which is provided on the cooling water piping and which cools cooling water discharged from the fuel cell, wherein
cooling water cooled by the radiator is pumped and the fuel cell is cooled after the operation of the fuel cell is stopped.

6. The fuel cell system according to claim 3, further comprising
a radiator which is provided on the cooling water piping and which cools cooling water discharged from the fuel cell, wherein
cooling water cooled by the radiator is pumped and the fuel cell is cooled after the operation of the fuel cell is stopped.

* * * * *